United States Patent
Sanchez et al.

(10) Patent No.: US 8,206,082 B2
(45) Date of Patent: Jun. 26, 2012

(54) PACKING SEAL ROTOR LANDS

(75) Inventors: Nestor Hernandez Sanchez, Schenectady, NY (US); Dhaval Ramesh Bhalodia, Schenectady, NY (US)

(73) Assignee: General Electric Company, Schenectady, NY (US)

( * ) Notice: Subject to any disclaimer, the term of this patent is extended or adjusted under 35 U.S.C. 154(b) by 584 days.

(21) Appl. No.: 12/432,272

(22) Filed: Apr. 29, 2009

(65) Prior Publication Data

US 2010/0276892 A1  Nov. 4, 2010

(51) Int. Cl.
F01D 11/00 (2006.01)
F01D 25/16 (2006.01)
F03D 11/00 (2006.01)

(52) U.S. Cl. .......................................... 415/110; 277/418

(58) Field of Classification Search .................. 277/418, 277/419, 420, 546, 547; 415/110, 111, 174.5, 415/173.5, 230; 416/174
See application file for complete search history.

(56) References Cited

U.S. PATENT DOCUMENTS

| 1,831,242 | A | 11/1931 | Hanzlik |
| 1,848,613 | A | 3/1932 | Flanders |
| 5,029,876 | A | 7/1991 | Orlando et al. |
| 6,168,377 | B1 | 1/2001 | Wolfe et al. |
| 6,394,459 | B1 * | 5/2002 | Florin .......................... 277/303 |
| 6,854,735 | B2 | 2/2005 | Sarshar et al. |
| 7,094,029 | B2 | 8/2006 | Taylor et al. |
| 7,500,396 | B2 | 3/2009 | Bentzel |
| 2011/0250073 | A1 * | 10/2011 | Neeli ......................... 416/223 R |
| 2011/0280715 | A1 * | 11/2011 | Garg et al. ................. 415/174.5 |

FOREIGN PATENT DOCUMENTS

DE  964737 C  5/1957

OTHER PUBLICATIONS

EP 10161433.7, European Search Report and Written Opinion, Aug. 24, 2010.

* cited by examiner

Primary Examiner — S. V. Clark
(74) Attorney, Agent, or Firm — Fletcher Yoder, P.C.

(57) ABSTRACT

In one embodiment, a packing seal has a plurality of lands that align with annular teeth. Each land has opposite axial sides relative to a rotational axis of a rotary component. Each land also has a recess in at least one of the opposite sides.

20 Claims, 6 Drawing Sheets

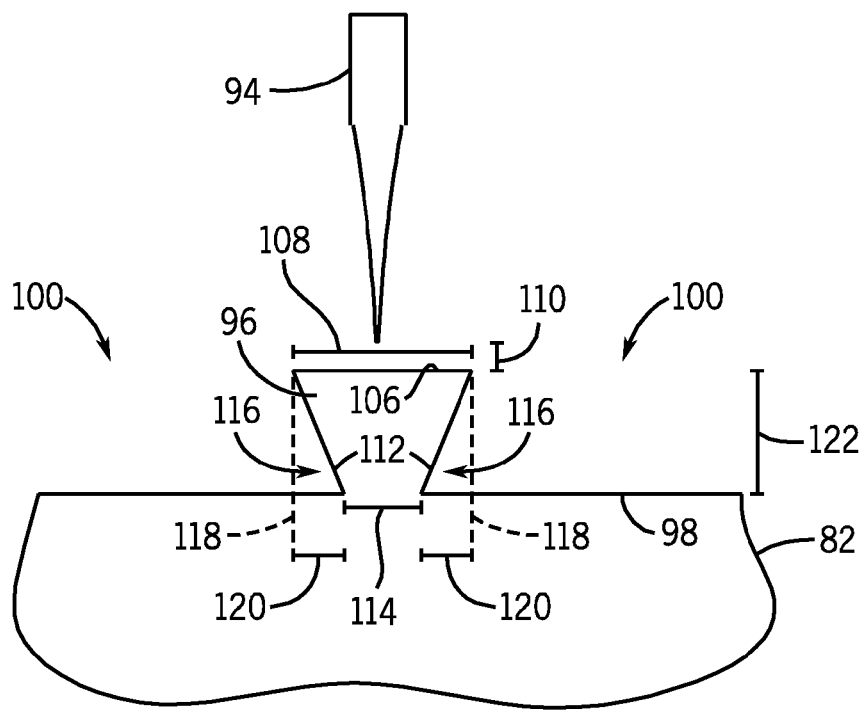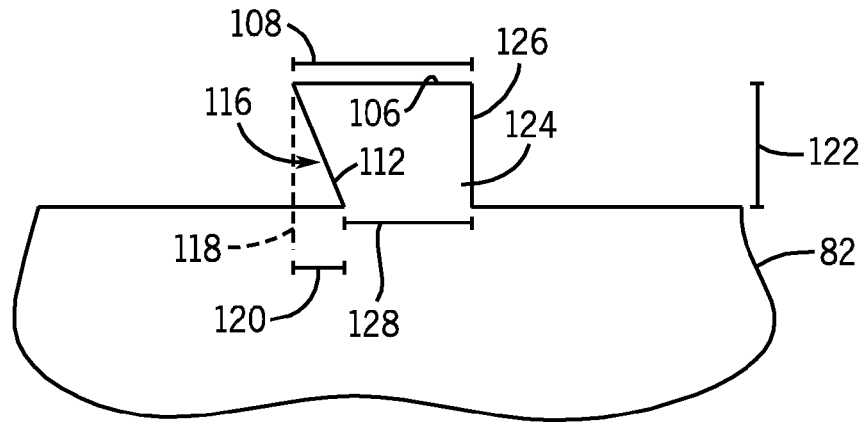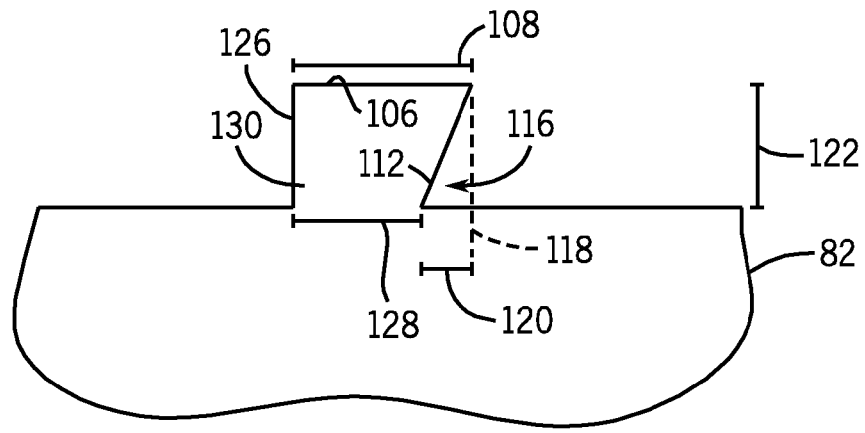

US 8,206,082 B2

PACKING SEAL ROTOR LANDS

BACKGROUND OF THE INVENTION

The subject matter disclosed herein relates to packing seals, and more specifically, to rotor lands employed in packing seals.

In general, packing seals may be employed between rotating and stationary parts in rotary machines, such as steam turbines, gas turbines, generators, and compressors. The rotary machines may flow a fluid between one or more stages of rotating components to generate power or to compress the fluid. Packing seals may be located between the stages, at the entrance to the stages, and/or at the exit to the stages to reduce leakage of fluid between fixed and rotating components. Packing seals generally include a series of teeth that interface with rotor lands to form restrictions to inhibit flow of fluid. Unfortunately, the fluid often flows directly toward the interface, which can result in greater leakage.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a rotary machine and a packing seal disposed between rotary and stationary components of the rotary machine. The packing seal includes a plurality of teeth disposed at first axial positions spaced apart from one another along a rotational axis of the rotary component and a plurality of lands disposed at the first axial positions in axial alignment with the plurality of teeth. The lands each include first and second axial sides opposite from one another relative to the rotational axis, and a recess in the first side, the second side, or both.

In a second embodiment, a system includes a rotor with an annular land configured to align with a packing ring in a turbine engine. The annular land includes a radial protrusion extending from a first radius to a radial surface at a second radius. The radial surface is configured to align with the packing ring. The radial protrusion has a first axial dimension between the first and second radius, and the radial protrusion has a second axial dimension at the second radius. The first axial dimension is at least approximately 20 percent less than the second axial dimension.

In a third embodiment, a system includes a packing seal configured to mount between a shroud and a rotor having a plurality of blades. The packing seal includes an annular land comprising a radial surface configured to align with an annular tooth, and first and second sides extending from the rotor to the radial surface and extending opposite to one another. The first side at least partially extends toward the second side relative to a rotational axis of the rotor.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein:

FIG. 5 is a cross-sectional view of an embodiment of one of the rotor lands of the packing seal taken within arcuate line 5-5 of FIG. 3;

FIG. 6 is a cross-sectional view of an embodiment of a rotor land employing an upstream recess;

FIG. 7 is a cross-sectional view of an embodiment of a rotor land employing a downstream recess;

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The present disclosure is directed to packing seals with recessed rotor lands. Packing seals generally include a packing ring that surrounds a rotor to separate high-pressure and low-pressure regions within a rotary machine, such as a steam turbine, gas turbine, compressor, or generator. Teeth may extend radially inwards toward the rotor to interface with rotor lands projecting radially outward from the rotor. Chambers may be formed between the teeth and rotor lands to convert kinetic energy of a fluid flowing through the seal to pressure energy, thereby minimizing leakage of the fluid from high-pressure regions to low-pressure regions. The rotor lands may have one or more recesses intended to increase the size of the chambers, guide the fluid flow, and/or induce recirculation. In particular, the recesses may improve the pressure distribution to reduce the pressure against the interface between each tooth and rotor land. For example, the recesses may induce or increase swirling of the fluid flow. In this manner, the recesses may reduce fluid leakage and facilitate the conversion of kinetic energy to pressure energy. However, the width of the rotor land surface that interfaces with the seal teeth may still be sufficient to ensure that the rotor land interfaces with the seal teeth even during axial movement of the seal teeth and/or rotor lands. In other words, the interface may not change, while the recess is disposed adjacent to the interface.

Figure 1:
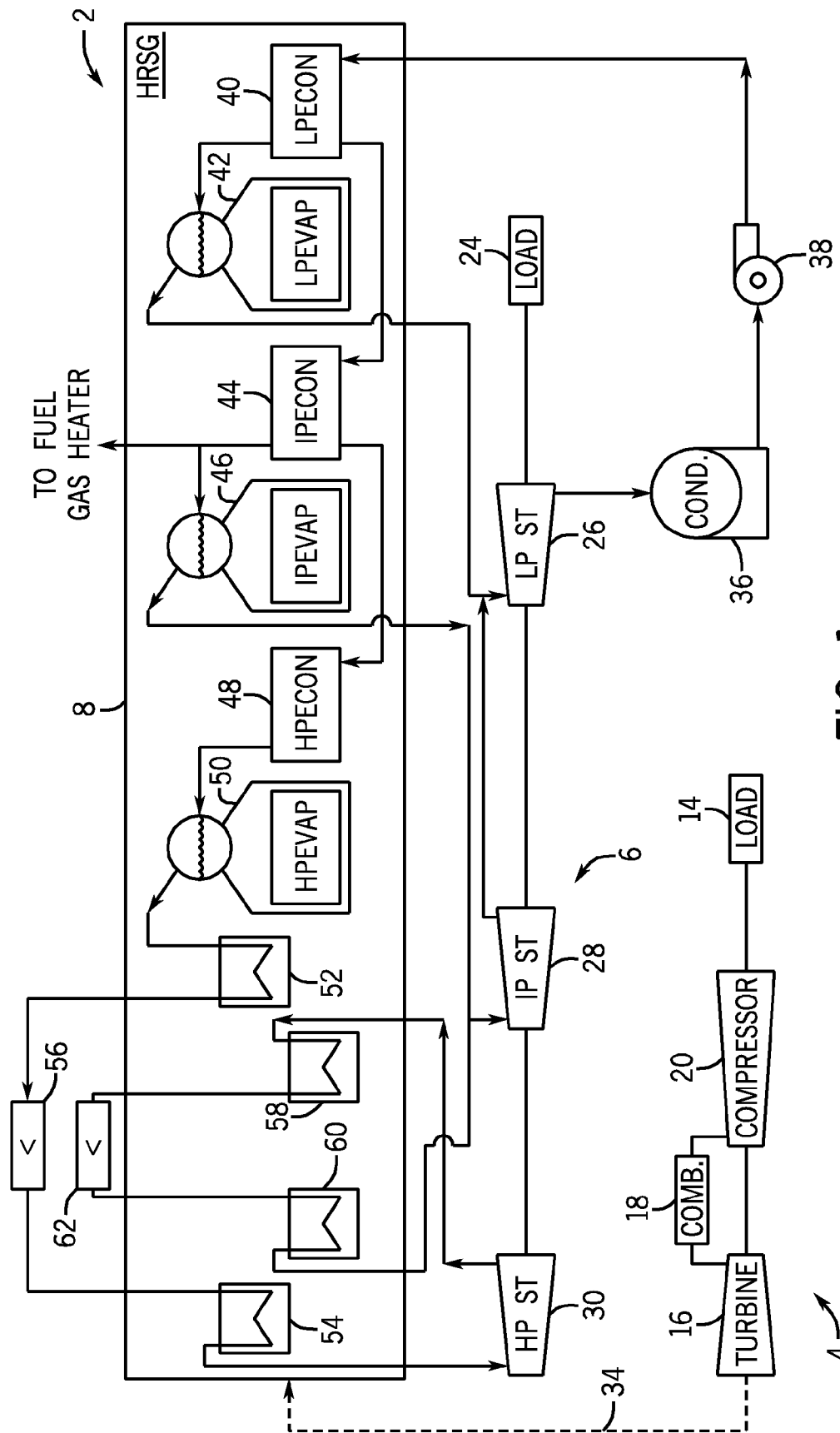
FIG. 1 is a schematic flow diagram of an embodiment of a combined cycle power generation system having a gas turbine, a steam turbine, and an HRSG that may employ packing seals.

FIG. 1 is a schematic flow diagram of an embodiment of a combined cycle power generation system 2 that may utilize packing seals. The system 2 may include a gas turbine 4, a steam turbine 6, and a heat recovery steam generation (HRSG) system 8. Within the gas turbine 4, fuel, such as syngas, may be combusted to generate power within a "topping," or Brayton, cycle. Exhaust gas from the gas turbine 4 may be supplied to the HRSG system 8 to generate steam within a "bottoming," or Rankine, cycle. In certain embodiments, the gas turbine 4, the steam turbine 6, and the HRSG system 8 may be included within an integrated gasification combined cycle (IGCC) power plant.

The gas turbine 4 may generally combust a fuel (e.g., gas or liquid fuel) to drive a first load 14. The first load 14 may, for instance, be an electrical generator for producing electrical power. The gas turbine 4 may include a turbine 16, a combustor or combustion chamber 18, and a compressor 20. The exhaust gas from the gas turbine 16 may be supplied to the steam turbine 22 (through the HRSG system 8) for driving a second load 24. The second load 24 may also be an electrical generator for generating electrical power. However, both the first and second loads 14, 24 may be other types of loads capable of being driven by the gas turbine 4 and steam turbine 6. In addition, although the gas turbine 4 and steam turbine 6 may drive separate loads 14 and 24, as shown in the illustrated embodiment, the gas turbine 4 and steam turbine 6 also may be utilized in tandem to drive a single load via a single shaft. In the illustrated embodiment, the steam turbine 6 may include one low-pressure section 26 (LP ST), one intermediate-pressure section 28 (IP ST), and one high-pressure section 30 (HP ST). However, the specific configuration of the steam turbine 6, as well as the gas turbine 4, may be implementation-specific and may include any combination of sections.

The system 2 also includes the HRSG system 8 for employing heat from the gas turbine 4 to generate steam for the steam turbine 6. The components of the HRSG system 8 in the illustrated embodiment are a simplified depiction and are not intended to be limiting. Rather, the illustrated HRSG system 8 is shown to convey the general operation of such HRSG systems. Heated exhaust gas 34 from the gas turbine 4 may be transported into the HRSG system 8 and used to heat steam used to power the steam turbine 6. Exhaust from the low-pressure section 26 of the steam turbine 6 may be directed into a condenser 36. Condensate from the condenser 36 may, in turn, be directed into a low-pressure section of the HRSG system 8 with the aid of a condensate pump 38.

The condensate may then flow through a low-pressure economizer 40 (LPECON), which is a device configured to heat feedwater with gases, may be used to heat the condensate. From the low-pressure economizer 40, the condensate may either be directed into a low-pressure evaporator 42 (LPEVAP) or toward an intermediate-pressure economizer 44 (IPECON). Steam from the low-pressure evaporator 42 may be returned to the low-pressure section 26 of the steam turbine 6. Likewise, from the intermediate-pressure economizer 44, the condensate may either be directed into an intermediate-pressure evaporator 46 (IPEVAP) or toward a high-pressure economizer 48 (HPECON). In addition, steam from the intermediate-pressure economizer 44 may be sent to a fuel gas heater (not shown) where the steam may be used to heat fuel gas for use in the combustion chamber 18 of the gas turbine 4. Steam from the intermediate-pressure evaporator 46 may be sent to the intermediate-pressure section 28 of the steam turbine 6. Again, the connections between the economizers, evaporators, and the steam turbine 6 may vary across implementations, as the illustrated embodiment is merely illustrative of the general operation of an HRSG system.

Finally, condensate from the high-pressure economizer 48 may be directed into a high-pressure evaporator 50 (HPEVAP). Steam exiting the high-pressure evaporator 50 may be directed into a primary high-pressure superheater 52 and a finishing high-pressure superheater 54, where the steam is superheated and eventually sent to the high-pressure section 30 of the steam turbine 6. Exhaust from the high-pressure section 30 of the steam turbine 6 may, in turn, be directed into the intermediate-pressure section 28 of the steam turbine 6, and exhaust from the intermediate-pressure section 28 of the steam turbine 6 may be directed into the low-pressure section 26 of the steam turbine 6.

An inter-stage attemperator 56 may be located in between the primary high-pressure superheater 52 and the finishing high-pressure superheater 54. The inter-stage attemperator 56 may allow for more robust control of the exhaust temperature of steam from the finishing high-pressure superheater 54. Specifically, the inter-stage attemperator 56 may be configured to control the temperature of steam exiting the finishing high-pressure superheater 54 by injecting cooler feedwater spray into the superheated steam upstream of the finishing high-pressure superheater 54 whenever the exhaust temperature of the steam exiting the finishing high-pressure superheater 54 exceeds a predetermined value.

In addition, exhaust from the high-pressure section 30 of the steam turbine 6 may be directed into a primary re-heater 58 and a secondary re-heater 60 where it may be re-heated before being directed into the intermediate-pressure section 28 of the steam turbine 6. The primary re-heater 58 and secondary re-heater 60 may also be associated with an inter-stage attemperator 62 for controlling the exhaust steam temperature from the re-heaters. Specifically, the inter-stage attemperator 62 may be configured to control the temperature of steam exiting the secondary re-heater 60 by injecting cooler feedwater spray into the superheated steam upstream of the secondary re-heater 60 whenever the exhaust temperature of the steam exiting the secondary re-heater 60 exceeds a predetermined value.

In combined cycle systems such as system 2, hot exhaust may flow from the gas turbine 4 and pass through the HRSG system 8 and may be used to generate high-pressure, high-temperature steam. The steam produced by the HRSG system 8 may then be passed through the steam turbine 6 for power generation. In addition, the produced steam may also be supplied to any other processes where superheated steam may be used. The gas turbine generation cycle is often referred to as the "topping cycle," whereas the steam turbine generation cycle is often referred to as the "bottoming cycle." By combining these two cycles as illustrated in FIG. 1, the combined cycle power generation system 2 may lead to greater efficiencies in both cycles. In particular, exhaust heat from the topping cycle may be captured and used to generate steam for use in the bottoming cycle. Of course, the combined cycle power generation system 2 is provided by way of example only and is not intended to be limiting. The rotor lands and packing seals described herein may be used in rotary machines, such as the gas turbine 4 and the steam turbine 6, employed in any suitable application. In certain embodiments, the rotor lands and packing seals may be employed in the turbine 16, the compressor 20, the high-pressure steam turbine 30, the intermediate pressure steam turbine 28, the low-pressure steam turbine 26, and/or within the HRSG system 2.

Figure 2:
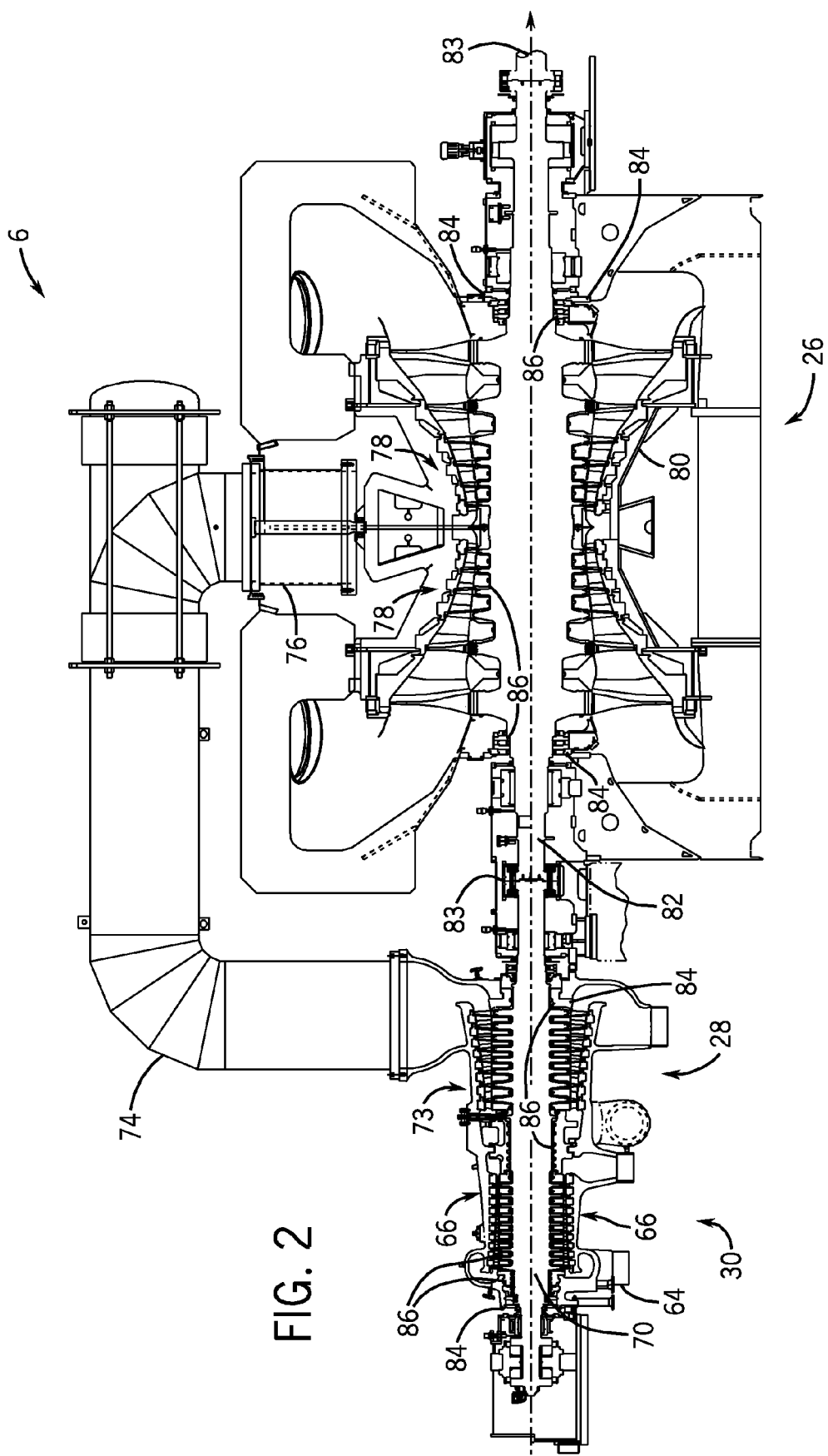
FIG. 2 is a cross-sectional side view of an embodiment of the steam turbine of FIG. 1.

FIG. 2 depicts an embodiment of the steam turbine 6 that includes the high-pressure-section 30, the intermediate-pressure section 28, and the low-pressure section 26 of FIG. 1. The steam turbine 6 includes a main steam inlet port 64 that may receive steam, for example, from the HRSG system 8 of FIG. 1. The steam may flow through a series of circumferentially spaced blades 66 mounted on a shaft 70 that rotates about an axis 72. From the high-pressure section 30, the steam may enter the intermediate-pressure section 28 and flow through another series of circumferentially spaced blades 73 mounted on the shaft 70. In certain embodiments, the steam may undergo heating before flowing into the intermediate-pressure section 28.

From the intermediate-pressure section 28, the steam may flow to the low-pressure section 26 through a crossover pipe 74 and an inlet box 76. Within the low-pressure section 26, the steam may flow in opposite axial directions through a series of circumferentially spaced blades 78 mounted on a shaft 82 that rotates about the axis 72. The shaft 82 may include flanges 83 disposed on axially opposite ends to couple the shaft 82 to the shaft 72 on one end, and to couple the shaft 82 to a generator shaft (not shown) on the other end.

Packing casings 84 may be included within the high-pressure section 30 and the intermediate pressure section 28 to minimize the leakage of steam around and/or between the stages 66 and 78. Specifically, the packing casings 84 may include axially spaced stationary shells encircling the rotational axis 72 that include packing seals 86 extending radially inward toward the rotational axis 72. The packing seals 86 may include teeth that interface with rotor lands projecting from the shafts 70 and 82 to create a tortuous path through the packing seals 86, thereby minimizing leakage of steam.

Figure 3:
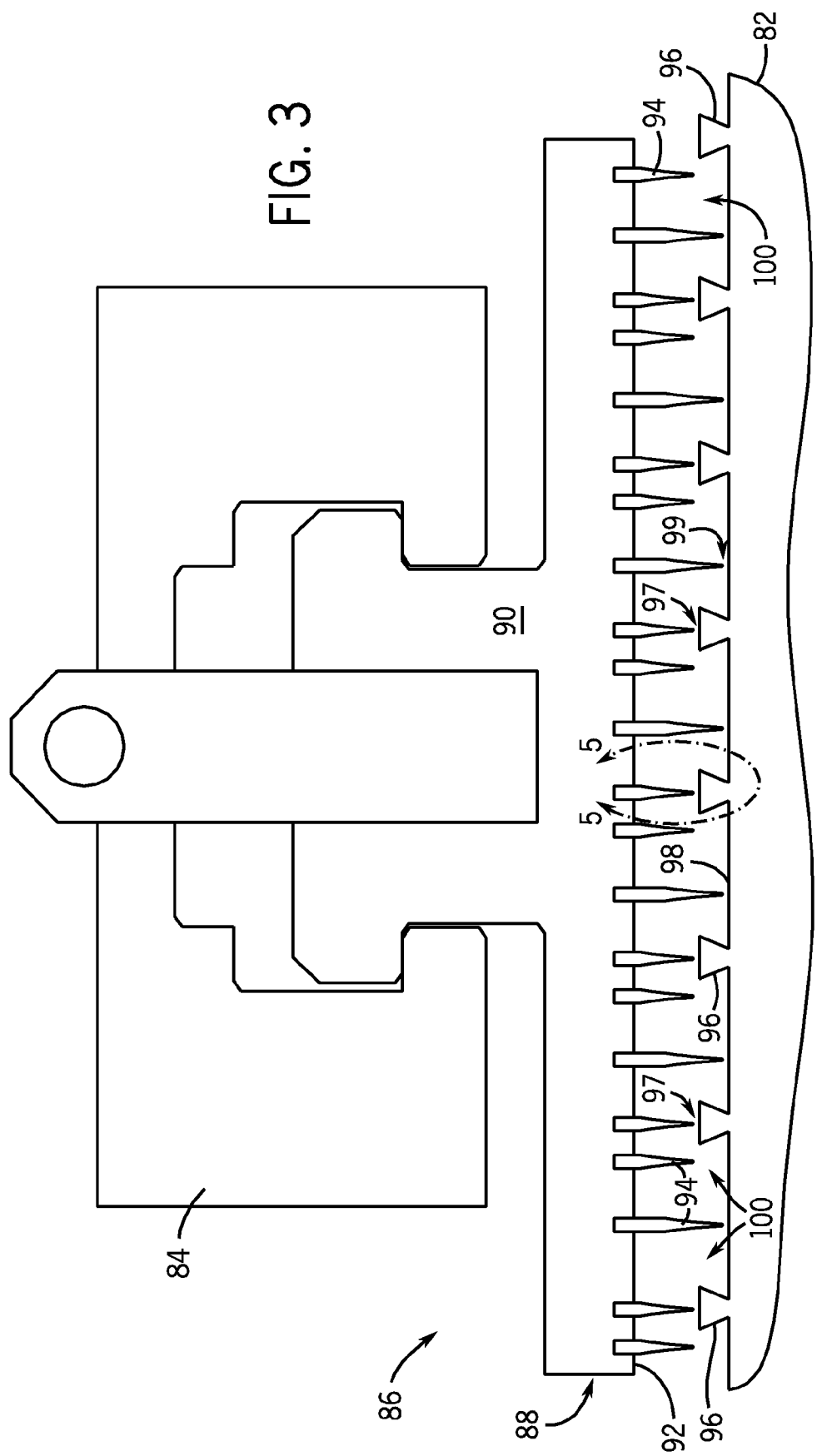
FIG. 3 is a cross-sectional view of an embodiment of one of the packing seals of FIG. 2.

FIG. 3 depicts an embodiment of one of the packing seals 86 located within the intermediate pressure section 28 shown in FIG. 2. Although the packing seal 86 is shown within the context of a steam turbine, the packing seals described herein may be employed within any suitable rotary machine, such as a gas turbine, compressor, steam turbine, or generator, among others. Further, the packing seals 86 may be located between stages or proximate to an inlet and/or outlet for the stages.

The packing seal 86 includes the packing casing 84 that encircles the shaft 82. A packing ring 88 is mounted to the packing seal 86 to surround the shaft 82. Although only one packing ring 88 is illustrated, in certain embodiments, multiple packing rings 88 may be axially spaced (direction 89) between stages within a rotary machine. Each packing ring 88 includes an annular array of arcuate seal segments 90, extending radially (direction 91) towards the shaft 82 from the packing casing 84. Each seal segment 90 includes an annular sealing surface 92 with annular seal teeth 94 that project radially (direction 91) toward the shaft 82. The seal teeth 94 may align and interface with annular rotor lands 96 projecting radially outward (direction 91) from the shaft 82 at interface locations 97. The seal teeth 94 also may align and interface with surfaces 98 of the shaft 82 located between the rotor lands 96 at interface locations 99. Small clearances may exist between the seal teeth 94, the rotor lands 96, and the surfaces 98 to restrict the flow of a fluid, such as steam, through the packing seal 86.

The rotor lands 96 may have a generally non-rectangular shape (e.g., a generally triangular shape) designed to increase the size of chambers 100 formed by the seal teeth 94 and the rotor lands 96. In certain embodiments, the increased size of the chambers 100 may be designed to convert more of the kinetic energy of the fluid flowing through the packing seal 86 to pressure energy, thereby minimizing leakage of fluid through the packing seal 86. Furthermore, the shape of the rotor lands 96 may be designed to improve the pressure distribution upstream and/or downstream of each rotor land 96 and seal tooth 94. For example, the shape of the rotor lands 96 may guide or induce the fluid flow to re-circulate or swirl, (e.g., small-scale eddies and/or large scale vortices), thereby reducing direct flow toward the interface between each land 96 and tooth 94. Thus, the fluid flow may tend to flow radially (direction 91) along or across the interface (e.g., parallel to the tooth 94) rather than directly axially (direction 89) against and through the interface (e.g., perpendicular to the tooth 94).

Figure 4:
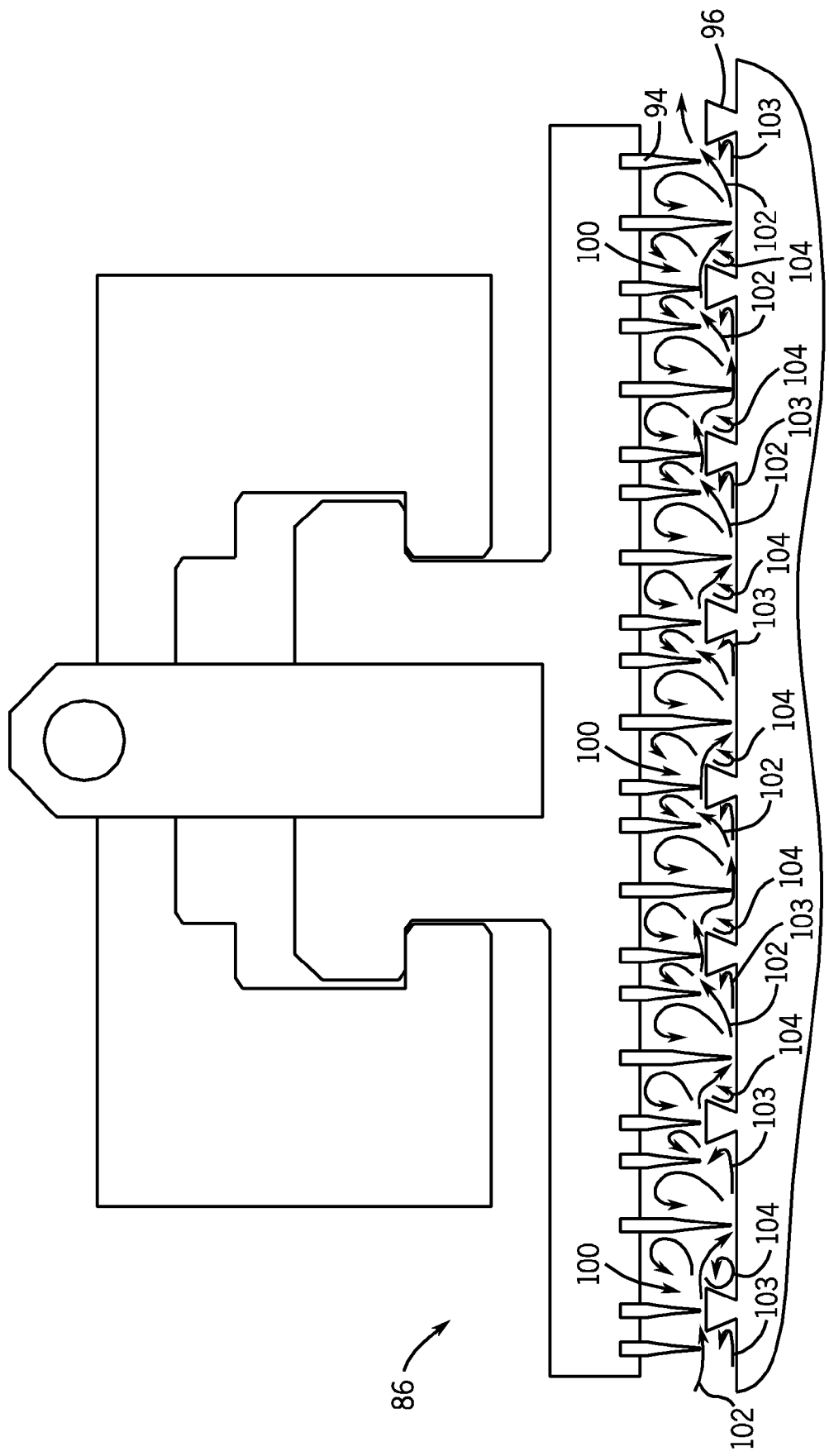
FIG. 4 is a cross-sectional view of the packing seal of FIG. 3 illustrating fluid flow through the packing seal.

FIG. 4 depicts the flow of a fluid through a portion of the packing seal 86. Arrows 102 and 104 may generally indicate the flow of the fluid. However, in other embodiments, the shape of the flow, eddies, and/or vortexes within the packing seal 86 may vary. Arrows 102 generally indicate the flow of the fluid through the gaps between the packing teeth 94 and the rotor lands 96. The kinetic energy of the fluid may be reduced as the fluid flows through each of the gaps. The triangular shape of the rotor lands 96 may create swirling, recirculation, and/or reverse flow 103 when the fluid contacts an upstream side of the triangular recesses of the rotor lands 96. In certain embodiments, the reverse flow 103 may turn by approximately 45-180 degrees to flow towards the opposite direction. The reverse flow 103 may contribute to the decrease in kinetic energy of the fluid flowing through the packing seal 86. The triangular shape of the rotor lands 96 also may create swirled flow 104 on the downstream side of the triangular recesses of the rotor lands 96. In certain embodiments, the swirled flow 104 may contribute to the decrease in kinetic energy of the fluid flowing through the packing seal 86. Moreover, the triangular shape of the rotor lands 96 may increase the size of the chambers 100. In certain embodiments, the triangular recesses may minimize leakage of the fluid through the packing seals by at least approximately 5-25 percent, and all subranges therebetween.

FIG. 5 is a cross-sectional view of one of the rotor lands 96 depicted in FIG. 4. The rotor land 96 includes a radial surface 106 that interfaces with one of the seal teeth 94. The radial surface 106 has an axial dimension or width 108 that is substantially larger than the tip of the seal tooth 94. The width 108 may be of a sufficient length to ensure that the seal tooth 94 aligns with the radial surface 106 of the rotor land 96 even during operation of the rotary machine when the seal tooth 94 and/or the rotor land 96 may move axially (i.e., relative to the axis of rotation 72 shown in FIG. 2). According to certain embodiments, the width 108 may be approximately 1.3-12.7 mm (50-500 mils), and all subranges therebetween. A clearance 110 may exist between the seal tooth 94 and the radial surface 106 to reduce the possibility of a rub and to restrict fluid flow between the seal tooth 94 and the rotor land 96. In certain embodiments, the clearance 110 may be approximately 0.3-2.5 mm (10-100 mils), or even more specifically the clearance 110 may be approximately 1.3 mm (50 mils).

The rotor land 96 also may include opposite sides 112 extending from the radial surface 106 (e.g., radially inward towards the axis 72 shown in FIG. 3). The opposite sides 112 may converge towards one another to define a second axial dimension or width 114. Width 114 may be located at or above a radial position about the axis 72 (FIG. 2) generally defined by the surface 98. Width 114 may be generally smaller than width 108. For example, width 114 may be at least approximately 1, 5, 10, 20, 30, 40, 50, 60, 70, 80, or 90 percent less than width 108.

The opposite sides 112 may form annular recesses 116 generally defined by the dashed lines 118. The recesses 116 may each have a triangular shape that provides additional volume for each of the chambers 100. The recesses 116 may have a major dimension or depth 120 that extends inwardly toward the axial center of the rotor land 96. According to certain embodiments, the depth 120 may be at least approximately 1, 5, 10, 15, 20, 25, 30, 35, 40, 45, or 50 percent of the width 108 of the radial surface 106. More specifically, the depth 20 may be at least approximately 20 percent of the width 108. The rotor land 96 also may extend radially outward from the surface 98 at a height 122. In certain embodiments, the height 122 may be approximately 1.3-12.7 mm (50-500 mils), and all subranges therebetween.

Of course, the relative dimensions 108, 110, 114, and 120, and geometry of the rotor land 96 are provided by way of example only, and are not intended to be limiting. For example, the depth 120 of each of the recesses 116 may be different from one another. In another example, the relative dimensions of the widths 108 and 114 may vary. Moreover, a recess 116 may be included on one of the sides 112 or on both of the sides 112. Further, the recesses 116 may have other geometries, such as a chevron, rectangle, square, oval, curve, semi-circle, or crescent, among others. Accordingly, FIGS. 6-9 illustrate other embodiments of rotor lands employing different types of recesses. However, any suitable shape of a recess may be employed on one or both of the sides 112 of the rotor lands 96. Further, the sides 112 may have the same or different type of recess.

FIG. 6 depicts a rotor land 124 with one recess 116 located on the upstream side 112 of the rotor land 124. Side 112 extends inward towards the axial center of the rotor land 124 to form the recess 116, while opposite side 126 extends generally perpendicular to the radial surface 106 to form a relatively straight side 126. The inner radial dimension or width 128 may be less than the width 108 of the radial surface 106.

FIG. 7 depicts a rotor land 130 with one recess 116 located on the downstream side 112 of the rotor land 130. Similar to the rotor land 124 illustrated in FIG. 6, the recess 116 may reduce the inner radial dimension or width 128, such that the width 128 is less that the width 108 of the radial surface 106. However, in this embodiment, the recess 116 may be located on the downstream side 112 of the rotor land while the opposite straight side 126 may be located on the upstream side 126.

Figure 8:
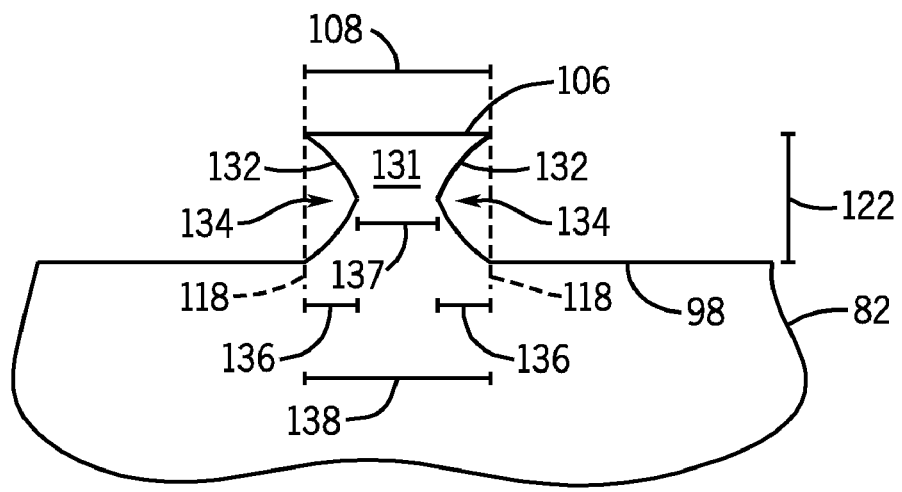
FIG. 8 is a cross-sectional view of an embodiment of a rotor land employing curved recesses.

FIG. 8 depicts a rotor land 131 with curved sides 132 that converge towards each other to form semi-circular recesses 134 (e.g., concave, c-shaped, or u-shaped). Each recess 134 may converge towards the axial center of the rotor land 131 at a major dimension or depth 136. According to certain embodiments, the depth 136 may be at least approximately 1, 5, 10, 15, 20, 25, 30, 35, 40, 45, or 50 percent of the width 108 of the radial surface 106. More specifically, the depth 136 may be at least approximately 20 percent of the width 108. The recesses 134 may converge towards each other to form a minor dimension or width 137 of the rotor land 131. The width 137 may be located at a radial location somewhere between the surface 98 and the radial surface 106. In certain embodiments, the width 137 may be approximately 1, 5, 10, 20, 30, 40, 50, 60, 70, 80, or 90 percent less than width 108. Further, the width 137 may be smaller than a width 138 of the rotor land 131 located at relatively the same radial location as the surface 98. The width 138 may be substantially equal to the width 108, or may be greater than or less than the width 108.

Figure 9:
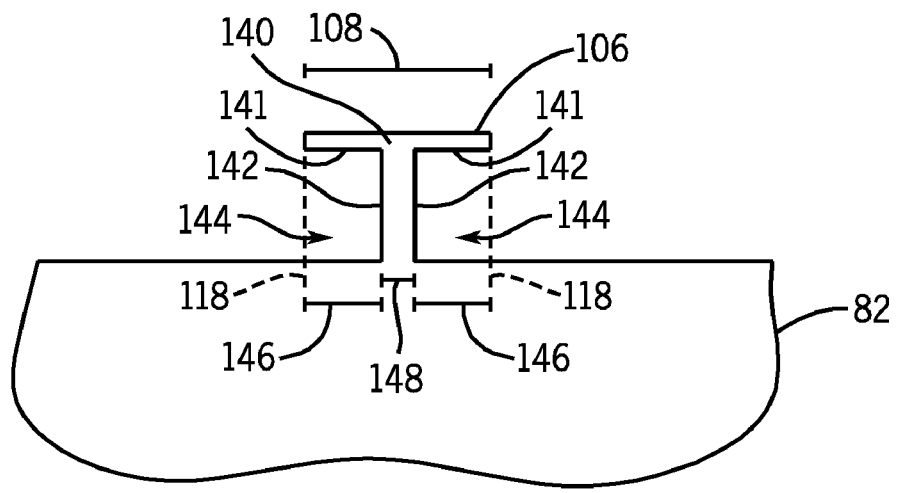
FIG. 9 is a cross-sectional view of an embodiment of a rotor land employing rectangular recesses.

FIG. 9 depicts a rotor land 140 with sides 141 that extend towards one another and towards the axial center of the rotor land 140. Generally parallel sides 142 extend generally perpendicular to the sides 141 to form rectangular recesses 144. The sides 141 and 142 may form a T-shaped rotor land 140. Each recess 144 may have a depth 146. According to certain embodiments, the depth 146 may be at least approximately 1, 5, 10, 15, 20, 25, 30, 35, 40, 45, or 50 percent of the width 108 of the radial surface 106. More specifically, the depth 146 may be at least approximately 20 percent of the width 108. The recesses 144 may extend towards each other to form a minor dimension or width 148 of the rotor land 140. The width 148 may be located at a radial position about the axis 72 (FIG. 2) generally defined by the surface 98. Further, the width 148 may be generally smaller than width 108. For example, the width 146 may be at least approximately 1, 5, 10, 20, 30, 40, 50, 60, 70, 80, or 90 percent less than width 108.

Each of the rotor lands 96, 124, 130, 131, and 140 may be designed to convert more of the kinetic energy of the fluid flowing through the packing seal 86 to pressure energy, thereby minimizing leakage and improving sealing. Specifically, each of the rotor lands 96, 124, 130, 131, and 140 may include recesses 116, 134 and 144 designed to increase the size of the chambers 100 (FIG. 3). The recesses 116, 134, and 144 also may improve pressure distribution upstream and/or downstream of each rotor land 96, 124, 130, 131, and 140 by inducing the fluid flow to re-circulate, swirl, and/or reverse direction, which in turn may reduce direct flow toward the interfaces between the rotor lands 96, 124, 130, 131, and 141 and the seal teeth 94.

Moreover, the relative shapes, dimensions, and sizes of the rotor lands may vary. For example, a curved side 132 (FIG. 8) may be located on one side of a rotor land while a straight side 126 (FIG. 7), angled side 112 (FIG. 5), or rectangular side 141 and 142 (FIG. 9) is located on the opposite side of the rotor land. Further, the relative heights, widths, and depths of the rotor lands and/or recesses may vary. Moreover, the specified heights, widths, depths, and/or clearances between the rotor lands and seal teeth may vary depending on factors such as the size of the rotary machine. Any suitable geometry and/or combination of recesses may be employed to provide rotor lands with a recessed portion designed to increase the volume of at least one of the chambers 100 (FIG. 3) and/or induce fluid recirculation, swirling, and/or reverse flow.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:
1. A system, comprising:
a rotary machine; and
a packing seal disposed between rotary and stationary components of the rotary machine, wherein the packing seal comprises:
a plurality of teeth disposed at first axial positions spaced apart from one another along a rotational axis of the rotary component; and
a plurality of lands disposed at the first axial positions in axial alignment with the plurality of teeth, wherein the lands each comprise first and second axial sides opposite from one another relative to the rotational axis, and a recess in the first side, the second side, or both, wherein the recess comprises a generally triangular recess.

2. The system of claim 1, wherein the plurality of teeth are annular shaped teeth, the plurality of lands are annular shaped lands, and the recesses are annular shaped recesses extending axially inwardly into the lands.

3. The system of claim 1, wherein the first and second sides comprise opposite recesses, and the opposite recesses converge toward one another.

4. The system of claim 1, wherein the recess is disposed on the first side of the land against a fluid flow in a first direction from the first side toward the second side, wherein the recess is configured to reverse the fluid flow from the first direction to a second direction.

5. The system of claim 1, wherein the recess has an axial depth of at least approximately 20 percent of an axial dimension from the first side to the second side along a radial surface interfacing with a corresponding tooth.

6. The system of claim 1, wherein the rotary machine comprises a steam turbine having the packing seal.

7. A system, comprising:
a rotor comprising an annular land configured to align with a packing ring in a turbine engine, wherein the annular land comprises:
a radial protrusion extending from a first radius to a radial surface at a second radius, wherein the radial surface is configured to align with the packing ring, the radial protrusion has a first axial dimension between the first and second radius, the radial protrusion has a second axial dimension at the second radius, and the first axial dimension is at least approximately 20 percent less than the second axial dimension.

8. The system of claim 7, wherein the radial protrusion comprises a generally triangular protrusion or a generally T-shaped protrusion.

9. The system of claim 7, wherein the radial protrusion comprises at least one recess configured to reverse flow of a fluid through the packing ring.

10. The system of claim 7, wherein the radial protrusion extends radially outward from the rotor towards the packing ring.

11. The system of claim 7, comprising another radial protrusion axially spaced from the radial protrusion and configured to align with the packing ring to form at least one chamber axially between the radial protrusions.

12. The system of claim 11, wherein the first axial dimension defines at least a portion of the chamber.

13. The system of claim 7, wherein the first axial dimension is at least approximately 40 percent less than the second axial dimension.

14. A system, comprising:
a packing seal configured to mount between a shroud and a rotor having a plurality of blades, wherein the packing seal comprises:
an annular land comprising a radial surface configured to align with an annular tooth, and first and second sides extending from the rotor to the radial surface and extending opposite to one another, wherein the first side at least partially axially extends toward the second side relative to a rotational axis of the rotor; and
wherein the plurality of blades comprises at least two stages, and wherein the annular land is disposed on the rotor between the two stages, directly upstream of the two stages, or directly downstream of the two stages.

15. The system of claim 14, wherein at least one of the first side or the second side comprises a recess extending into the annular land.

16. The system of claim 15, wherein the recess is configured to reverse flow of a fluid away from the first side or the second side.

17. The system of claim 15, wherein the recess comprises a generally triangular recess.

18. The system of claim 7, wherein the radial protrusion comprises a generally rectangular recess.

19. The system of claim 7, wherein the radial protrusion comprises a curved recess.

20. The system of claim 7, wherein the radial protrusion comprises curved sides that converge toward each other.

* * * * *